Figure 1:
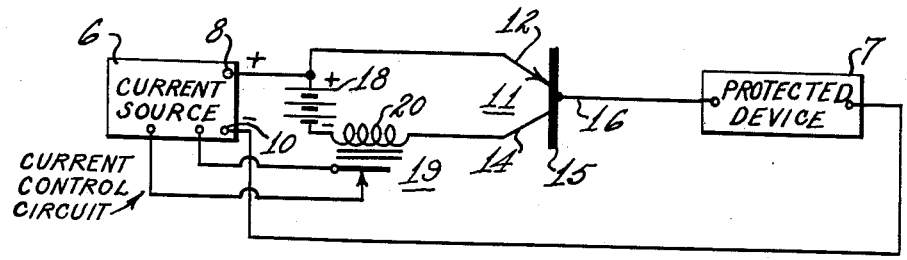

July 1, 1958  D. D. MAWHINNEY  2,841,746
PROTECTIVE CIRCUIT
Filed May 19, 1955  2 Sheets-Sheet 1

INVENTOR.
DANIEL D. MAWHINNEY
BY
*H. C. Newton*
ATTORNEY

July 1, 1958  D. D. MAWHINNEY  2,841,746
PROTECTIVE CIRCUIT
Filed May 19, 1955  2 Sheets-Sheet 2

INVENTOR.
DANIEL D. MAWHINNEY
BY
ATTORNEY

United States Patent Office 2,841,746
Patented July 1, 1958

2,841,746

PROTECTIVE CIRCUIT

Daniel D. Mawhinney, Jersey City, N. J., assignor to Radio Corporation of America, a corporation of Delaware Application May 19, 1955, Serial No. 509,537

9 Claims. (Cl. 317—51)

This invention relates to circuit means for protecting electrical devices such as electrical meters and the like, and in particular to circuit means of this type for protecting electrical devices against excessive current.

Electrical devices which are actuated by direct current, such as microammeters or other electrical instruments or circuits, may be extremely delicate in construction and thus easily damaged or even destroyed by excessive current. For this reason, means are often provided in circuit with such devices to protect them against current which exceeds a predetermined magnitude, depending on the amount of current the particular device can tolerate. One method of protecting such devices is to include an overload relay in the circuit which is actuated directly from the current source when the current reaches a predetermined value. Relays of this type may divert a considerable amount of power from the circuit. Moreover, the series resistance of the relay coil is required in the circuit when a relay is used for this purpose.

It is, accordingly, an object of the present invention to provide improved circuit means for protecting electrical devices against excessive current wherein power drain from the circuit is minimized.

It is another object of the present invention to provide improved circuit means including a semi-conductor device such as a transistor for protecting electrical devices such as current meters and the like against excessive current and wherein current and power drain are minimized.

It is yet another object of the present invention to provide improved circuit protection means including a transistor for protecting electrical devices against predetermined excessive current wherein the range of current over which the protective means is operative is relatively large.

It is a still further object of the present invention to provide improved circuit protection means including a transistor which is sensitive to relatively small currents and which operates with a relatively small power drain from the circuit.

These and further objects and advantages of the present invention are achieved by a protective circuit including an overload relay and a transistor. The conductive path defined from the base to the emitter of the transistor is connected in circuit with the current source and with the device which is to be protected, such as a meter. The relay coil and a source of energizing potential for the transistor are serially connected between the emitter and collector of the transistor, the relay coil thereby serving as a load for the transistor. The amplified current provided by the transistor is then used to actuate the relay to remove the current source from the circuit, thus providing the required protection for the meter or other device. By this expedient only a small percentage of the power from the current source is needed to actuate the relay, especially compared with that which would be needed to operate the relay directly.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figures 1, 2, 3, 4 and 5 are schematic circuit diagrams, partially in block form, of protective circuits utilizing transistors and embodying the present invention in different forms.

Referring now to the drawing, wherein like parts are indicated by like reference numerals throughout the figures and referring particularly to Figure 1, a current source 6 of any suitable type, such as a power supply or battery, is connected to provide direct current for a device 7, which may be any direct current operated instrument such as, for example, a microammeter. The current source 6 includes a positive terminal 8 and a negative terminal 10. The negative terminal 10 is connected in series with the device 7 which is to be protected. The positive terminal 8 of the current source 6 is connected, in accordance with the invention, directly to the emitter 12 of a transistor 11, which may be considered to be a P–N–P junction transistor. The transistor 11 also has a collector 14 and a base 16 which are cooperatively associated in a well known manner with a semi-conductive body 15. The transistor 11, while preferably of the junction type, could be of any other suitable type having characteristics similar to those of junction transistors. Moreover, transistors of opposite conductivity types, i. e., of P type conductivity, could be used if the polarity of the terminals 8 and 10 of the current source, as well as of the biasing battery for the transistor, were reversed.

The base 16 of the transistor 11 is connected directly with the protective device 7. Thus, the conductive path defined by the base and emitter circuits of the transistor 11 is connected, in accordance with the invention, in series between the positive terminal 8 of the current source 6 and the protective device 7. To provide the proper biasing potentials for amplifier operation of the transistor 11, a battery 18 is provided, the positive terminal of which is connected to the emitter 12 and the negative terminal of which is connected through a coil 20 of an overload relay 19 to the collector 14 of the transistor 11. As mentioned above, the polarity of the battery 18 would be reversed if a transistor of P type conductivity were utilized.

The contacts of the relay, which is normally closed as shown, are connected to the current source. The relay 19 is connected with the current source 6 in any suitable manner, so that when the relay 19 is actuated the current source 6 is preferably immediately removed from the circuit or alternatively its current output is reduced to a safe value. The relay 19 may be, for example, of the type wherein it is momentarily operative to remove the current source and then closes, or it may be of the type which remains locked until it is manually or electrically reset. In either of these cases, the circuits which embody the invention will be substantially the same, the difference being in the specific connections for the control means including the relay 19 with the current source 6.

The emitter-to-base resistance of a transistor is much less than the collector-to-base resistance. Accordingly, in operation, the major portion of the current from the current source 8 flows in the emitter-to-base circuit of the transistor 11. Through the current amplifying properties of the transistor 11, a current which is proportional to the current from the source 6 and the product of this current and the current gain of the transistor 11 flows through the coil 20 of the relay 19. When this current reaches some predetermined value, the relay will be actuated. Accordingly, when the current from the source 6 attains this predetermined value, the current source 6 will be removed from the circuit. Thus the device 7 is protected against overcurrents. Since the current from the source 6 is amplified by the transistor 11 to actuate the relay, the power drain from the circuit is considerably less than that which would be required to actuate the relay directly.

A transistor of P type conductivity may also be used with a current source having terminals of the same polarity as the source 6 in Figure 1. To this end, in Figure 2 a transistor 22, which may be considered to be an N–P–N junction transistor, has its base 24 connected directly with the positive terminal 8 of the current source 6. The transistor 22 further includes an emitter 26 and a collector 28 which are cooperatively associated with a semi-conductive body 30 in a well known manner.

The emitter 26 of the transistor 22 is connected directly with the protected device which is illustrated as being a meter such as a microammeter 9. Accordingly, the conductive path from the base 24 to the emitter 26 through the semi-conductive body 30 is connected in series between the positive terminal 8 of the current source 6 and the meter 9. To provide the necessary biasing potentials for the transistor, the biasing battery 18 has its negative terminal connected directly with the emitter 26 and its positive terminal connected through the coil 20 of the relay 19 to the collector 28.

Figure 2:
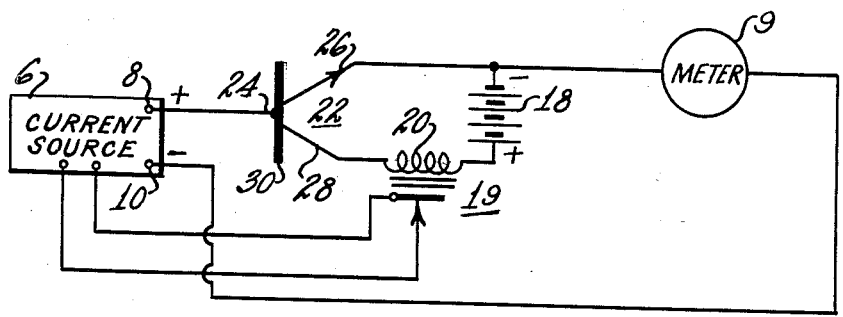

The circuit illustrated in Figure 2 is otherwise the same as the one illustrated in Figure 1 and its operation is similar. It should be realized that a transistor of N type conductivity could also be used if the polarity of the terminals 8 and 10 of the current source 6, as well as of the biasing battery 18, were reversed.

Figure 3:
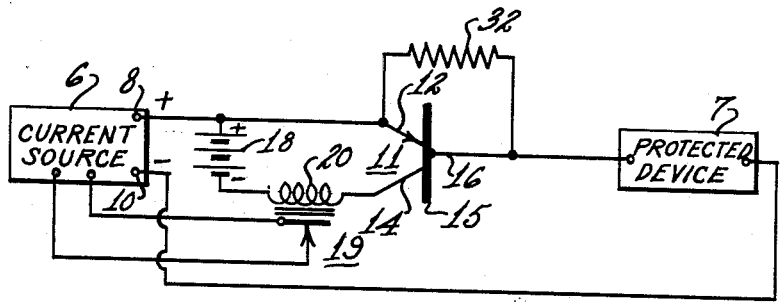

In order to increase the current range over which circuits embodying the invention can operate, the circuit illustrated in Figure 3 may be utilized. This circuit is identical to the one illustrated in Figure 1 except that a resistor 32 has been connected in series between the emitter 12 and the base 16 of the transistor 11. By this expedient, a parallel current path around the transistor is provided for current from the source 6. Accordingly, the current from the source 6 divides between this path and the path from the emitter to the base of the transistor 11. The resistor 32 allows the maximum current through the protected device 7 to be adjusted by determining the part of the current from the source 6 which will flow in the base circuit of the transistor. Since the base current determines the current through the relay coil 20, the resistance of the resistor 32 serves to control the operation of the relay 19.

Moreover, since the resistor 32 is in parallel with the emitter-to-base resistance of the transistor 11, the total series resistance which is included in the circuit is reduced. The resistor 32 also permits the circuit to protect the device 7 against current which may exceed the maximum base current rating of the particular transistor used. Accordingly, the upper limit of current against which protection is obtained is not limited by the transistor and larger currents may be accommodated. A typical resistance value for the resistor 32 would be in the order of 50 ohms. If an 80 milliwatt relay having a coil resistance of 5000 ohms were used, therefore, by way of example, slightly less than 50 ohms series resistance and a voltage drop of approximately 0.2 volt would be sufficient to operate the relay. By way of contrast, using the same relay as the sole protective means, a potential of 20 volts would be required. It should be understood that a resistor may be connected in series between the emitter and base of a transistor connected as illustrated in Figure 2 with the same advantages.

Figure 4:
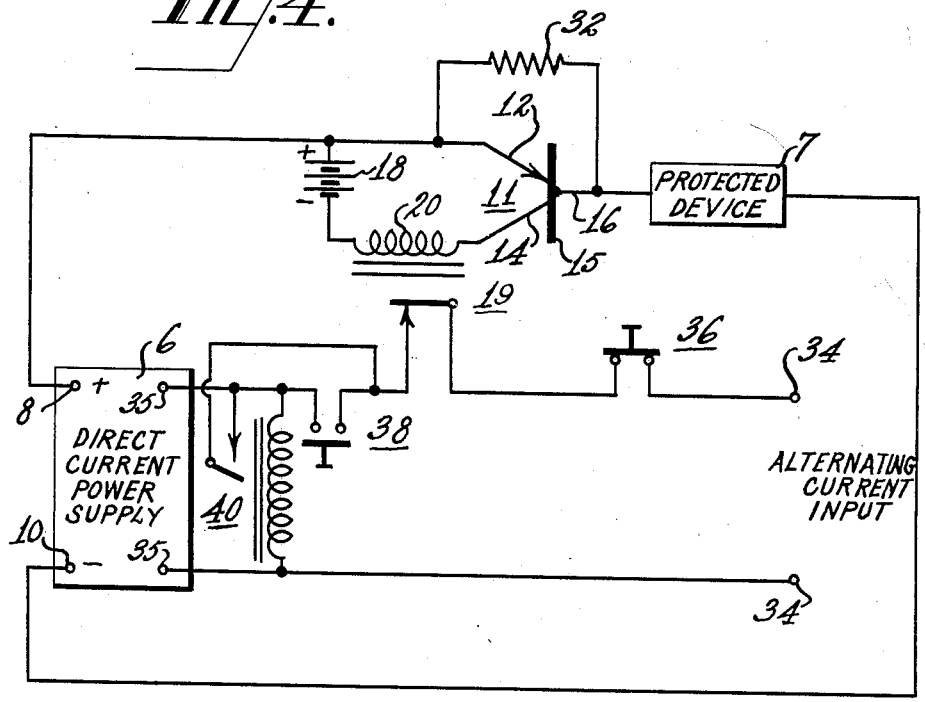

Referring now to Figure 4, one circuit arrangement in which the control means or relay 19 could be connected with the current source 6, which is illustrated as being a direct current power supply such as a rectifier, so as to remove the current source 6 from the circuit when the relay 19 is actuated includes the transistor 11 and a protected device 7, such as a microammeter. The transistor 11, the relay 19 and the protected device 7 are all connected in circuit with the positive and negative terminals 8 and 10 of the current source 6 in the same manner as in Figure 3. An alternating current is applied to the circuit at the input terminals 34. One of the input terminals 34 is connected through a conventional push-button two-point switch 36, which will be referred to as the "off" switch, to the contacts of the relay 19. Depending then on the particular point of time in the circuit operation, a connection is made in one instance to the upper one of the input terminals 35 of the direct current power supply 6 through a second push-button two-point switch 38, which will be referred to as the "on" switch. In this case, of course, the "on" switch 38 will be closed. Alternatively, the connection will be made through the contacts of a second relay 40, the coil of which is connected in parallel with the input terminals 34. When the contacts of the relay 40 are closed, the "on" switch 38 will be short-circuited. The other or lower input terminal 34 to which the alternating current is applied is connected directly with the other or lower input terminal 35 of the direct current power supply 6.

In operation, an alternating current is applied to the input terminals 34, and the push-button switches 36 and 38 are both in the "on" position. Accordingly, the applied alternating current flows through the switch 36, the contacts of the relay 19 and the switch 34 to the coil of the relay 40. The relay 40 is thus energized, closing its contacts which will short-circuit the switch 38. The switch 38 will then be released and the direct current power supply 6 will be supplied with power from the alternating current input supply.

When the direct current from the direct current power supply attains a predetermined excessive value, the relay 19 will be energized in a manner similar to that described in connection with the preceding figures. The contacts of the relay 19 will thus be opened, which will remove the energizing current for the relay 40, also opening its contacts and preventing the application of alternating current to the power supply 6. In this manner, the current source is removed from the circuit and the device 7 is protected. The circuit operation can then be started again by resetting the "on" switch 38.

The circuit illustrated in Figure 4 provides circuit means for providing the required protection of the device 7 in which "on" and "off" switches are used to control the start of the circuit operation. While one specific control arrangement has been illustrated, others will become apparent. As an example, the contacts of the relay 19 could be connected in circuit directly between one of the alternating current input terminals 34 and one of the direct current power supply terminals 35 so that upon excessive current from the power supply 6 the contacts of the relay would open to remove the alternating current input supply. All that is required is that the control means including the relay 19 be effective to either remove the current source 6 entirely from the circuit or reduce the current to a safe value.

Figure 5:
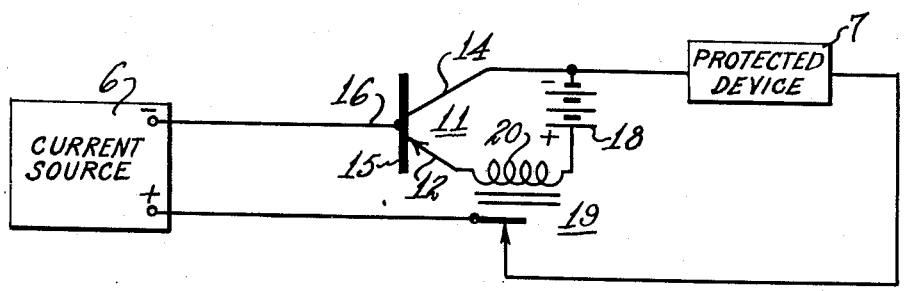

In Figure 5, another embodiment of the invention includes the transistor 11, the protected device 7 and the current source 6. In this embodiment the transistor 11 is arranged so that the conductive path between the base 16 and collector 14 through the semi-conductive body 15 is connected in series between one terminal of the current source 6 and the protected device 7. Thus the coil of the relay 19 serves as a load for the emitter 12 of the transistor 11 rather than the collector as in the preceding figures.

Another difference in the circuit illustrated in Figure 5 is that the contacts of the relay 19 are connected directly in series between one terminal of the protected device 7 and the positive terminal of the current source 6. Accordingly, when a predetermined excessive current flows from the source 6 the relay 19 will be actuated to open the circuit between the protected device 7 and the current source 6 to protect the device 7 against the excess current. The circuit illustrated in Figure 5 may be useful where a higher impedance is desired in circuit between the current source and the device which is to be protected. In general, however, it is preferable to use the relay coil as a load for the collector and connect the base-emitter circuit of the transistor in series between the current source and the protected device as shown in the preceding figures.

As described herein, improved circuit means for protecting electrical devices is, by provision of the invention, reliable and efficient in operation. Current and power drain are minimized and the circuit is operative over a relatively wide range of current. In addition, the circuit can be self-contained and connected directly to the protected device with no external power connections.

What is claimed is:

1. The combination with a current operated device and a current source having a pair of terminals of opposite polarities, of a transistor having a base, an emitter and a collector electrode and a base-emitter conductive path, direct-current conductive circuit means connecting said base-emitter path in series between one terminal of said source and said current operated device to provide direct operating current for said device from said source, direct-current conductive means connecting the other terminal of said source with said current operated device, and current operated control means for said source including a control impedance element connected between said collector and emitter electrodes to provide a collector electrode load for said transistor, said control means having a control connection with said source to provide protective control of the output current from said source in response to operating current of predetermined amplitude through said impedance element.

2. The combination defined in claim 1, wherein said transistor is of N type conductivity and the one terminal of said source is connected with the emitter electrode of said transistor and the base electrode of said transistor is connected with said current operated device.

3. The combination defined in claim 1, wherein said transistor is of P type conductivity and the one terminal of said source is connected with the base electrode of said transistor and the emitter electrode of said transistor is connected with said current operated device.

4. In combination with a source of direct current and a current sensitive device, a transistor including a base, a collector, and an emitter electrode adapted to provide a base-emitter conductive path, direct-current conductive means conductively connecting said source, said base-emitter conductive path and said device in series, and current operated control means including an impedance element connected between said collector and emitter electrodes to provide a load therefor, said control means having a control connection with said source of direct current to open said series connection in response to a predetermined current from said source through said impedance element.

5. The combination with a current meter and a current source for operating said meter and including a pair of terminals of opposite polarities, of a transistor including an emitter, a base and a collector electrode, first conductive circuit means connecting one terminal of said source with said meter, second conductive circuit means connecting the other terminal of said source with the emitter electrode of said transistor, third conductive circuit means connecting the base electrode of said transistor with said meter to provide a conductive series connection between said terminals including said transistor and said meter, means including a resistor connecting said emitter with said base electrode, relay control means including a coil including a pair of terminals one of which is connected with the collector electrode of said transistor to provide a load for said transistor and a contact and a movable switch member adapted to normally be in contacting engagement with said contact, means connecting said contact and said switch member with said current source to open said series connection in response to current flow of predetermined amplitude through said coil for preventing the flow of current to said meter, means providing a source of biasing potential for said transistor including a pair of terminals, means connecting one of the terminals of said source with the other terminal of said coil, and means connecting the other terminal of said source with the emitter electrode of said transistor.

6. The combination with a current sensitive device and a current source for operating said device and including a pair of terminals of opposite polarities, of a transistor including an emitter, a base and a collector electrode, first conductive circuit means connecting one terminal of said source with said device, second conductive circuit means connecting the other terminal of said source with the base electrode of said transistor, third conductive circuit means connecting the emitter electrode of said transistor with said device to provide a conductive series connection between said terminals including said transistor and said device, means including a resistor connecting said emitter with said base electrode, relay control means including a coil including a pair of terminals one of which is connected with the collector electrode of said transistor to provide a load for said transistor and a contact and a movable switch member adapted to normally be in contacting engagement with said contact, means connecting said contact and said switch member with said current source to open said series connection in response to current flow of predetermined amplitude through said coil for preventing the flow of current to said device, means providing a source of biasing potential for said transistor including a pair of terminals, means connecting one of the terminals of said source with the other terminal of said coil, and means connecting the other terminal of said source with the emitter electrode of said transistor.

7. The combination with a current sensitive device and a current source for operating said device and including a pair of termials of opposite polarities, of a transistor including an emitter, a base and a collector electrode, first conductive circuit means connecting one terminal of said source with said device, second conductive circuit means connecting the other terminal of said source with the base electrode of said transistor, third conductive circuit means connecting the emitter electrode of said transistor with said device to provide a conductive series connection between said terminals including said transistor and said device, relay control means including a coil including a pair of terminals one of which is connected with the collector electrode of said transistor to provide a load for said transistor and a contact and a movable switch member adapted to normally be in contacting engagement with said contact, means connecting said contact and said switch member with said current source to open said series connection in response to current flow of predetermined amplitude through said coil for preventing the flow of current to said device, means providing a source of biasing potential for said transistor including a pair of terminals, means connecting one of the terminals of said source with the other terminal of said coil, and means connecting the other terminal of said source with the emitter electrode of said transistor.

8. The combination with a current sensitive device and a current source for operating said device and including a pair of terminals of opposite polarities, of a transistor including an emitter, a base and a collector electrode, first conductive circuit means connecting one terminal of said source with said device, second conductive circuit means connecting the other terminal of said source with the emitter electrode of said transistor, third conductive circuit means connecting the base electrode of said transistor with said device to provide a conductive series connection between said terminals including said transistor and said device, relay control means including a coil including a pair of terminals one of which is connected with the collector electrode of said transistor and a contact and a movable switch member adapted to normally be in contacting engagement with said contact, means connecting said contact and said switch member with said current source to open said series connection in response to current flow of predetermined amplitude through said coil for preventing the flow of current to said device, and means providing a source of biasing potential for said transistor including a pair of terminals, means connecting one of the terminals of said source with the other terminal of said coil, and means connecting the other terminal of said source with the emitter electrode of said transistor.

9. In combination with a source of direct current and a current sensitive device, a transistor including a base and an emitter electrode adapted to provide a base-emitter conductive path, direct-current means conductively connecting said source, said base-emitter conductive path and said device in series, a resistor connected between said base and emitter electrodes, and relay control means including an inductive winding connected between said collector and emitter electrodes providing a load for said transistor, said relay control means including a switch connected with said source of direct current and responsive to current flow through said winding to prevent excessive current flow to said device in response to current of predetermined amplitude from said source through said inductive winding.

References Cited in the file of this patent
UNITED STATES PATENTS

| | | |
|---|---|---|
| 1,728,745 | Brown et al. | Sept. 17, 1929 |
| 1,871,787 | Goldsborough | Aug. 16, 1932 |
| 2,524,035 | Bardeen et al. | Oct. 3, 1950 |
| 2,561,411 | Pfann | July 24, 1951 |
| 2,576,026 | Meacham | Nov. 20, 1951 |
| 2,620,448 | Wallace | Dec. 2, 1952 |
| 2,652,460 | Wallace | Sept. 15, 1953 |
| 2,750,453 | Pritchard | June 12, 1956 |

OTHER REFERENCES

"Principles of Transistor Circuits" 1955. By R. J. Shea.